(12) United States Patent
Strolle et al.

(10) Patent No.: US 6,169,767 B1
(45) Date of Patent: Jan. 2, 2001

(54) UNIVERSAL NETWORK INTERFACE MODULE

(75) Inventors: Christopher M. Strolle, Glenside, PA (US); Steven T. Jaffe, Irvine, CA (US); William E. Meyer, Chelmsford, MA (US)

(73) Assignee: Sarnoff Corporation, Princeton, NJ (US)

( * ) Notice: Under 35 U.S.C. 154(b), the term of this patent shall be extended for 0 days.

(21) Appl. No.: 09/036,925

(22) Filed: Mar. 9, 1998

Related U.S. Application Data (60) Provisional application No. 60/040,149, filed on Mar. 10, 1997.

(51) Int. Cl.[7] .............................. H04L 27/12; H04L 27/10
(52) U.S. Cl. ......................... 375/302; 375/223; 375/295; 332/100
(58) Field of Search ..................................... 375/295, 296, 375/302, 271, 272, 278, 285, 223; 332/100, 103, 106

(56) References Cited

U.S. PATENT DOCUMENTS

| | | | |
|---|---|---|---|
| 5,309,484 | * 5/1994 | McLane et al. | 375/354 |
| 5,504,785 | * 4/1996 | Becker et al. | 375/344 |
| 5,559,834 | * 9/1996 | Edler | 375/260 |
| 5,610,942 | * 3/1997 | Chen et al. | 375/342 |
| 5,631,610 | * 5/1997 | Sandberg et al. | 332/170 |
| 5,640,416 | * 6/1997 | Chalmers | 375/206 |
| 5,757,867 | * 5/1998 | Caulfield et al. | 375/350 |

\* cited by examiner

Primary Examiner—Chi H. Pham
Assistant Examiner—Khai Tran
(74) Attorney, Agent, or Firm—William J. Burke (57) ABSTRACT

A variable rate modulator for selectively encoding a variable rate data stream according to one of a plurality of modulation formats. A timing and control circuit locks the variable rate data to a master clock, an encoder selectively encodes the data according to one of a plurality of modulation formats, and a polyphase filter performs pulse shaping and interpolation functions using only shift and add functions to produce a DAC-ready output signal.

18 Claims, 6 Drawing Sheets

UNIVERSAL NETWORK INTERFACE MODULE

The invention claims benefit of U.S. provisional application Ser. No. 60/040,149, filed Mar. 10, 1997 and incorporated herein by reference in its entirety.

The present invention relates to digital information communications equipment, and, more particularly, to a universal network interface module used in subscriber equipment of a digital information communication system.

BACKGROUND OF THE INVENTION

Digital information communications network utilization has shown phenomenal growth as represented by the growth in cellular telephones, cable and satellite television, the INTERNET, and the like. However, to fulfill the ever-growing need for communications systems, communications systems manufacturers utilize various network interfaces and, as a result, networks and their interfaces are as diverse as the applications which they support. Presently there are no universal network interface modules that allow a variety of application hardware types to interface with a plurality of bi-directional communications networks.

Therefore, it is seen to be desirable to provide a universal network interface module that directly interfaces with a transport network to transmit and receive data therefrom and pass the data to/from various types of application hardware.

SUMMARY OF THE INVENTION

The disadvantages heretofore associated with the prior art are overcome by the present invention of a universal network interface module that is connected between a digital information communications network and application hardware. The universal network interface module contains a forward channel receiver that is capable of demodulating forward channel information (e.g., video). The universal network interface module also contains a back channel transmitter for transmitting control information from the application hardware to the network. The back channel transmitter contains a variable rate modulator and digital-to-analog converter, a low pass filter and a power amplifier. The variable rate modulator is "universal" in that it generates a binary phase shift key (BPSK), quadrature-phase shift key (QPSK) or 16-level quadrature amplitude modulated (16QAM) signals. The modulated type is software selectable. This variable rate modulator uses a novel clock synchronization scheme as well as a polyphase FIR filter to perform both image rejection filtering and pulse shape filtering simultaneously.

Specifically, an apparatus according to the invention for selectively encoding a variable rate data stream according to one of a plurality of modulation formats, comprises: a timing control circuit, coupled to receive a data clock associated with the variable rate data stream and a fixed frequency master clock, for phase locking the data clock to the master clock to produce a locked data clock; an encoder, coupled to the timing control circuit and receiving the variable rate data stream at a rate determined by the locked data clock, for encoding, in response to a format selection signal, the variable rate data stream according to one of a plurality of encoding formats; and a polyphase filter, coupled to the encoder and the timing control circuit, for adapting a pulse shape characteristic and a baud rate characteristic of the encoded variable rate data stream to produce a modulated baseband signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
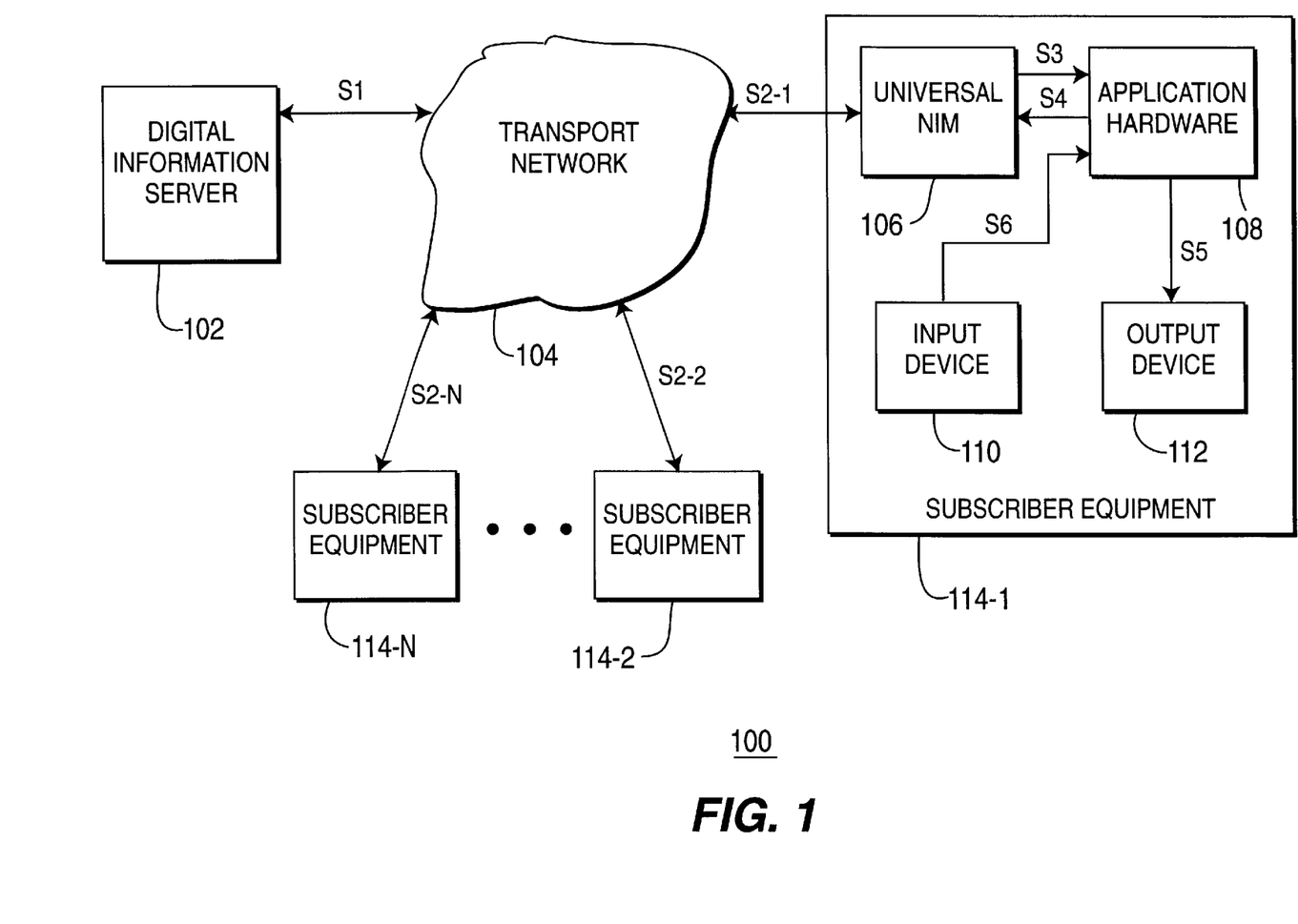
FIG. 1 is a high level block diagram of a digital information communications system.

FIG. 1 depicts a block diagram of a digital information communication system 100 containing a digital information server 102, a transport network 104, and subscriber equipment 114. The server 102 can be a video-on-demand (VOD) server, a cable system head end or some other interactive source of digital information signals that enable subscribers to request particular information for delivery through the network. The transport network 104 carries the digital information to and from subscriber equipment 114 at a plurality of locations. The subscriber equipment 114 is connected to the transport network 104 to receive digital information from the server as well as send commands to the server, e.g., requesting specific information therefrom and for controlling the presentation of that information.

The subscriber equipment 114 contains a universal network interface module (NIM) 106 connected to application hardware. The application hardware is connected to an input device 110 and an output device 112. Generally, the universal NIM is provided command data from the input device 110 (e.g., a remote control, keyboard and the like) passed through the application hardware. The NIM passes the command and control data to the digital information server via the transport network. The information that is requested or the command implementation is passed back through the transport network 104 to the universal NIM 106 and to the application hardware 108, where it is processed for utilization within the subscriber equipment 114, e.g., display on the output device 112. The application hardware 108 may comprise, illustratively, a transport stream demultiplexer, a cable modem demodulator or a data or video interface, where a transport demultiplexer is coupled to an ETHERNET protocol processor as well as an MPEG 2 to video decoder and audio decoder or some other multi-media decoder.

Figure 2:
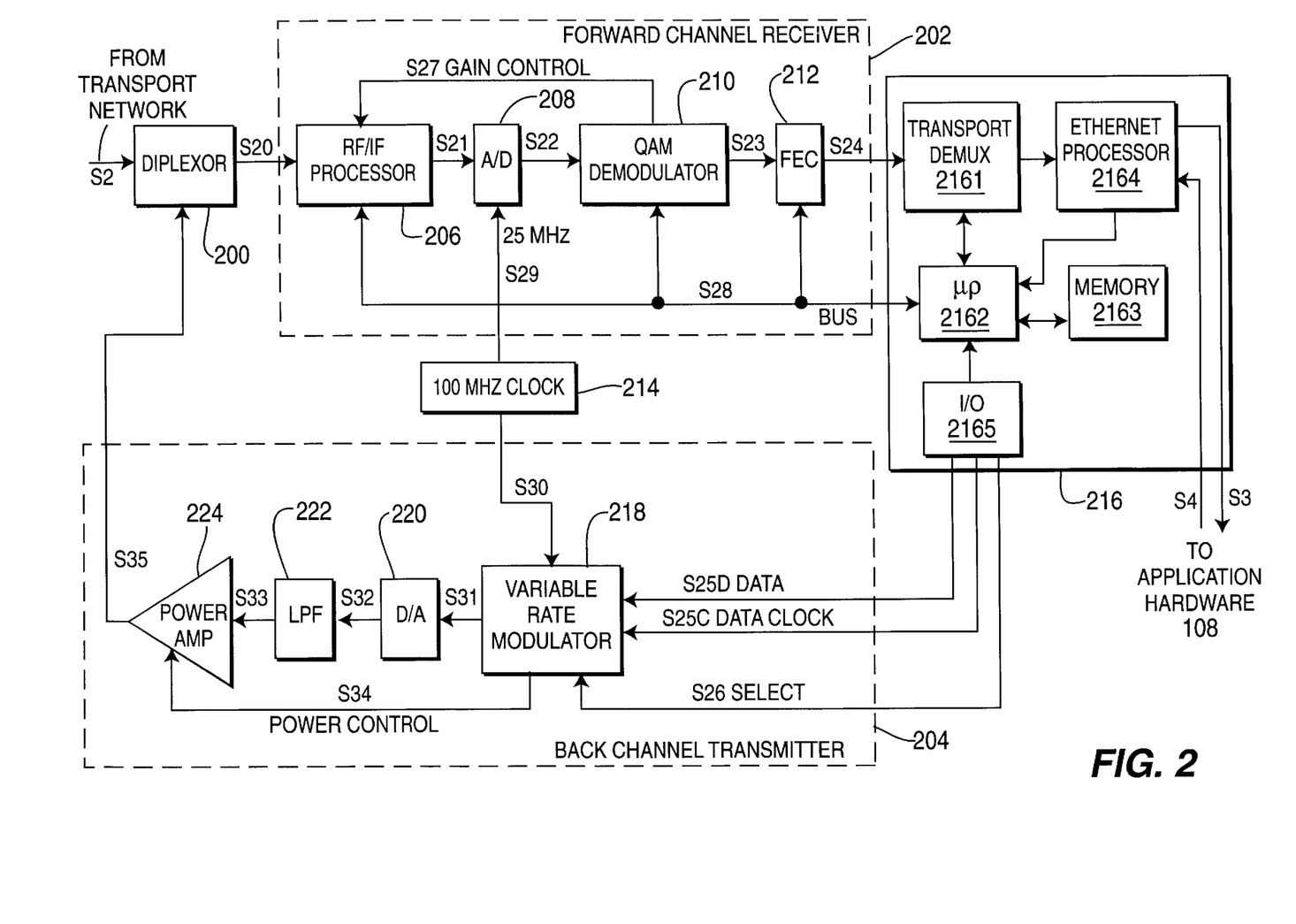
FIG. 2 depicts a block diagram of a universal network interface module according to the invention and suitable for use in the digital information communications system of FIG. 1.

FIG. 2 depicts a block diagram of a universal network interface module 106 according to the invention and suitable for use in the digital information communications system of FIG. 1. The network interface module 106 includes a diplexer 200, a forward channel receiver 202, a back channel transmitter 204, and an application interface 216. The forward channel information is generally carried on a high frequency carrier, e.g., 50–750 MHz and the back channel information is carried on a low frequency carrier, e.g., 5–50

MHz. Data received from the transport network 104 is passed through the diplexer 200 to the forward channel receiver 202 where it is processed to recover the baseband data. This data is passed to the application interface 216 which then processes and formats the data for compatibility with the application hardware 108.

The back channel transmitter 204 receives a data signal S25D, an associated clock signal S25C and a modulation format selection signal SELECT from the application interface 216. The data signal S25D is modulated according to a modulation format specified by the application interface 216 (via the modulation format selection signal SELECT) to produce a modulated output signal S35. The modulated output signal S35 is coupled to the diplexer for transmission through the transport network 104 to the digital information server 102.

More specifically, the forward channel receiver 202 contains an RF/IF processor 206, an analog-to-digital (A/D) converter 208, a demodulator 210 (e.g., a QAM, VSB, OQAM, or combination thereof), and a forward error correction (FEC) circuit 212. The RF/IF processor 206 amplifies and downconverts the RF signal S20 received from the transport network. The received signal S20 is A/D converted within the A/D converter 208 using a timing signal S29 derived from the master clock 214 (e.g., a 100 MHz clock) illustratively, a 25 Mhz converter rate. The demodulator 210 then demodulates the digitized signal S22. To ensure that a constant amplitude signal is present at the input to the A/D converter 208, the demodulator 210 also provides a gain control signal S27 for the RF/IF processor 206. The output S23 of the demodulator 210 is forward error corrected by the FEC 212 and the resulting data signal S24 is applied to the application interface 216 which then passes the resulting data on to the application hardware 108.

In general, the application interface 216 formats the data for compatibility with the application hardware. In the case of Ethernet protocol application hardware 108, the application interface 216 comprises, e.g., a transport demultiplexer 2161, an Ethernet processor 2164, a microprocessor 2162, a memory unit 2163 and an input/output (I/O) unit 2165. The transport demultiplexer 2161 operates to demultiplex the received transport stream S24. The Ethernet processor 2164 processes the resulting demultiplexed information stream(s) to produce an Ethernet protocol information stream S3 for use by the application hardware 108. The application hardware 108 also couples data to the Ethernet protocol processor 2164 as information stream S4.

The microprocessor 2162, which is coupled to the transport demultiplexer 2161, Ethernet processor 2164, memory unit 2163 and input/output (I/O) unit 2165, communicates with the forward channel receiver 202 via bus S28, and with the back channel transmitter 204 via the I/O unit 2165. The microprocessor 2162 receives the processed information stream from the Ethernet protocol processor 2164 and couples the information stream to the back channel transmitter 204 via the I/O unit 2165 in a standard manner. Alternatively, in a video distribution system, the transport data may be processed to baseband using an MPEG2 video and audio decoder to produce standard video and audio signals for use by the output device 112 within the subscriber equipment 114.

The back channel transmitter 204 contains a variable rate modulator 218, a digital-to-analog (D/A) converter 220, a low pass filter 222 and a power amp 224 all connected serially. The entire universal network interface module 106 is clocked by, illustratively, a clock source 214, illustratively providing a 100 MHz clock signal S30 to the variable rate modulator 218, and a 25 MHz clock signal S29 to the A/D converter 208. It should be noted that the 25 MHz clock signal S29 is simply the 100 MHz clock signal S30 divided by four. The variable rate modulator 218 allows any rate of data, in virtually any format, to be modulated onto a software selectable format such as BPSK, QPSK or 16 QAM (clearly, other numbers of levels of QAM could be used, e.g., 64,256 and the like). Demodulated data S31 is then D/A converted to form an analog signal S32 which is then low pass filtered. The low pass filtered signal S33 is passed through the power amplifier 224 to produce an amplified signal S35. The amplified signal S35 is then coupled to the diplexer 200, which in turn couples the amplified signal S35 to the transport network.

The variable rate modulator 218 contains a power control circuit which controls the output power of the power amplifier. Typically a head end of a cable television system or an information server such as digital information server 102 receives data transmitted by a subscriber and, in addition to processing the received data, monitors the power level of the received data and responsively directs (via a forward channel communication) that a particular subscriber increase or decrease the power of its back channel transmission as appropriate. In addition, the variable rate modulator is controlled by the application interface to select the proper modulation type for the back channel of the transport network.

The variable rate modulator 218 processes a serial data stream S25 and its associated sample clock S25C to generate a D/A converter (DAC) ready discrete time wave form S31. The variable rate modulator 218 produced DAC-ready wave form that has been differentially encoded modulated into a software selectable modulation type, interpolated to the output sample rate, pulse shape filtered, and spectrally shifted from baseband to a selectable carrier frequency. Although the input sample rate is unrestricted, however, typical rates are in the 0.2 to 5 million samples per second range when an output sample rate of 100 million samples per second is desired. The pulse-shaped filter uses, illustratively, a 20% excess bandwidth square root, raised cosine function. The carrier frequency is software programmable from DC to 50 MHz in 0.0466 Hz steps when a system clock of 100 MHz is used.

Two of the unique elements of the variable rate modulator 218 are the clock synchronization scheme and the implementation of the polyphase FIR filter to simultaneously perform both image rejection filtering and pulse shape filtering. The clock synchronization scheme is based on applying a phase locked loop to the input data clock. By treating this conventional control signal as a quantized information bearing signal, the phase lock loop operates on a substantially noise free signal, thereby optimizing the performance of the phase lock loop.

The exemplary filtering element comprises a 32 tap finite impulse response (FIR) filter with 256 selectable sets of coefficients. By selecting an appropriate set of coefficients (or phase of the polyphase filter) for the calculation of each output sample, the numerical results are equivalent to those achieved by directly applying an FIR filter with as many as 8192 taps. The exemplary filtering element is a "real only" type of filter in that both real and imaginary components of the input signal are processed by the same coefficient sets (i.e., there are no cross-terms). The filter is based on a standard multi-rate implementation of an FIR Other unique features of the variable rate modulator include storing the complex sinusoid samples in a look up table that is optimized to take advantage of the quadrant symmetry of a sine wave. Additionally, the bits-to-symbol mapping in the encoder is completely programmable. This allows the modulator to be compatible with virtually any form of BPSK/QPSK/16QAM modulation scheme.

Figure 3:
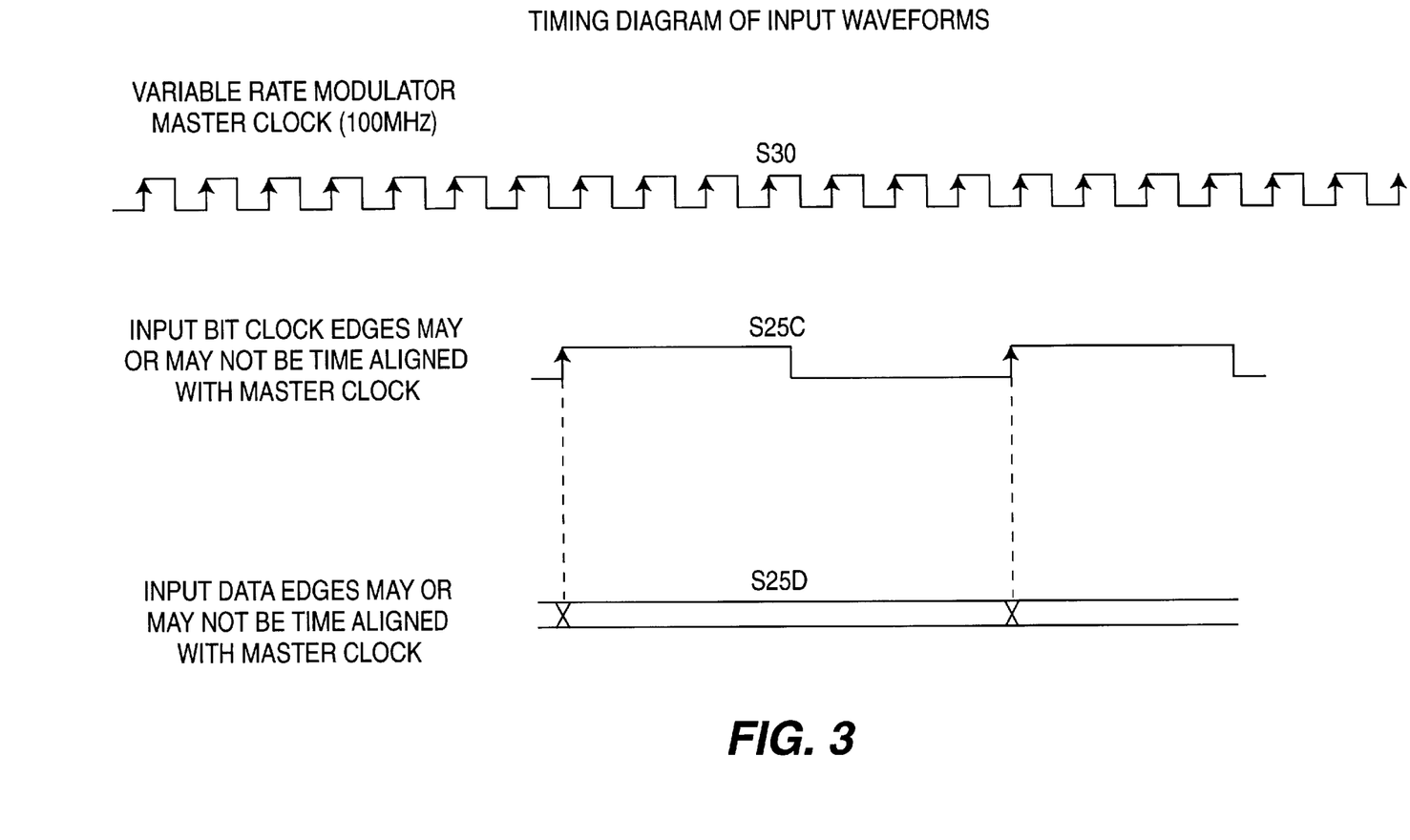
FIG. 3 depicts a block diagram of a timing diagram useful in understanding the invention.

FIG. 3 depicts a timing diagram useful in understanding the invention. Specifically, FIG. 3 depicts three waveforms utilized by the variable rate modulator 218 of FIG. 1. The top waveform is the 100 MHz master clock S30, the middle waveform is the input data clock S25C, and the bottom waveform is the input data S25D associated with the input data clock S25C. It is important to note that edges or clock transition points of the input data clock S25C are not necessarily aligned with the edges or clock transition points of the master clock. Similarly, the edges or clock transition points of the input data S25D are not necessarily aligned with the edges or clock transition points of the master clock.

Figure 4:
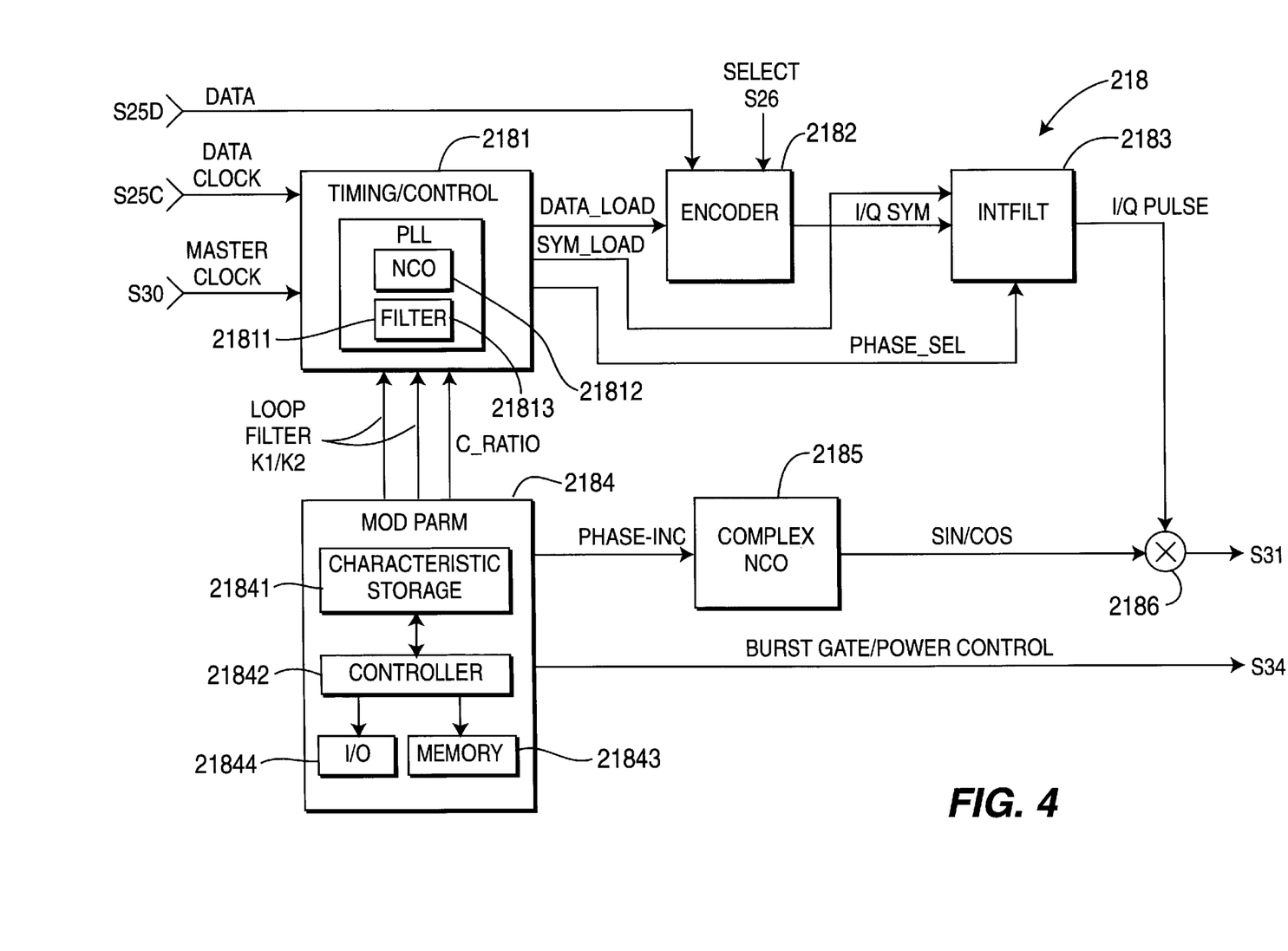
FIG. 4 depicts a block diagram of a variable rate modulator according to the invention and suitable for use in the universal network interface module of FIG. 2.

FIG. 4 depicts a variable rate modulator 218 according to the invention and suitable for use in the universal network interface module of FIG. 2. Specifically, the variable rate modulator 218 comprises a timing and control unit 2181, an encoder 2182 an interpolation filter 2183, a modulator parameter unit 2184, a complex numerically controlled oscillator (NCO) 2185 and a complex multiplier 2186.

The timing and control unit 2181 comprises a phase lock loop (PLL) 21811 an associated numerically controlled oscillator (NCO) 21812 and a filter 21813. The timing and control unit 2181 receives the data clock S25C and the master clock S30, and operates in a phase locked loop manner to lock the phase of the received data clock S25C to the phase of the master clock S30. That is, the edges of the received data clock S25C are aligned with the edges of the master clock S30.

The timing and control unit 2181, in response to a clock ratio parameter C_RANO signal received from the from the modulator parameter unit 2184, adjusts the operating range of the NCO 21812. The clock ratio parameter C_RATIO is a number that defines the average ratio between the nominal data rate of the input data clock S25C and the nominal data rate of the master clock S30. Thus, the clock ratio parameter C_RATIO is utilized as a numeric offset to the NCO 21812 within the phase locked loop of the timing and control unit 2181. Essentially, the clock ratio parameter C_RATIO is used in a manner similar to an offset voltage to a voltage controlled oscillator (VCO) within an analog phase locked loop circuit. For example, in one embodiment of the invention the master clock is a 100 MHz clock while the data clock S25C has an average frequency of 250 kHz, thereby producing a ratio of 4:1. The ratio may be very large (e.g., 1000:1 or more), depending on the dynamic range of the NCO 21812 and the ability of the timing controller 2181 to retain-phase lock with the master clock.

The efficacy of the PLL 21811 of the timing controller 2181 is enhanced in a known manner by using a filter 21813 to appropriately adapt the loop response characteristics to, e.g., the frequency of the data signal S25D. The loop response characteristics are adapted according to first and second loop filter parameters K1 and K2 that are received from the modulator parameter unit 2184.

The timing and control unit 2181 produces a clock signal DATA_LOAD comprising, essentially, the received data clock S25C having edges that are aligned with the master clock S30 edges. The clock signal DATA_LOAD is coupled to the encoder 2182, where it operates as the clock for the input data signal S25D.

The encoder 2182 receives the serial data signal S25D at a rate defined by the clock signal DATA_LOAD, and responsively produces an output signal I/Q SYM having an appropriate rate according to, e.g., a BPSK, QPSK, or 16 QAM encoding scheme. The encoding scheme is defined by the control signal SELECT (S26) that is received from the application interface 216 of FIG. 1. The encoder output signal I/Q SYM is coupled to the interpolation filter 2183 for further processing.

The timing and control unit 2181 produces a control signal SYMBOL_LOAD that is used to indicate that an I/Q symbol has been produced by the encoder 2182. Specifically, if a BPSK encoding scheme is used, then an I/Q symbol is produced by the encoder every data clock. If a QPSK encoding scheme is used, then an I/Q symbol is produced by the encoder every other data clock. If a 16 QAM encoding scheme is used, then an I/Q symbol is produced by the encoder every fourth data clock. Thus, the frequency of the SYMBOL_LOAD control signal used for BPSK encoding is double the SYMBOL_LOAD control signal frequency used for QPSK encoding, and four times the SYMBOL_LOAD control signal frequency used for 16 QAM encoding. The operation of the control signal SYMBOL_LOAD will be described in more detail below with respect to FIG. 5.

The timing and control unit 2181 produces a control signal PHASE_SEL that is used to adjust an interpolation step size within the interpolation filter. The interpolation step size is determined by selecting a coefficient from a plurality of stored coefficients. The selected coefficient sare used to shape the pulses of the variable rate in-phase I IN and quadrature-phase Q IN signals. The operation of the control signal PHASE_SEL will be described in more detail below with respect to FIGS. 5 and 6.

The interpolation filter 2183 receives the in-phase encoder output signal I SYM, the quadrature-phase encoder output symbol Q SYM and the control signals SYMBOL_LOAD and PHASE_SEL. In response to the control signals SYMBOL_LOAD and PHASE_SEL, the interpolation filter 2183 operates to pulse shape and bandwidth limit (i.e., select the appropriate baud rate) the input symbols I/Q SYM. The output of the interpolation filter 2183 I/Q PULSE is coupled to an input of the multiplier 2186 and comprises in-phase and quadrature-phase encoded symbol pulses that have been band limited to the baud rate requirements indicated by the root raised cosine function. The operation of the interpolation filter 2183 will be described in more detail below with respect to FIGS. 5 and 6.

The timing and control unit 2181 produces a control signal PHASE_SEL that us used by the interpolation filter to select a coefficient for convolving with the in-phase I IN and quadrature-phase Q IN symbol streams, thereby shaping the pulses forming those streams. The operation of the control signal PHASE_SEL will be described in more detail below with respect to FIGS. 5 and 6.

The modulator parameter unit 2184 comprises a characteristic storage unit 21841 that stores modulator parameters in response to a controller 21842. The controller 21842 is associated in a standard manner with a memory unit 21843 and an input/output (I/O) unit 21844. It should be noted that while the controller 21842 and its associated memory unit 21843 and I/O unit 21844 are depicted as being part of the modulator parameter unit 2184, these functions may be performed by circuitry located elsewhere, e.g., a central microprocessor within the back channel transmitter 204 or subscriber equipment 114.

The complex NCO 2185, in response to a control signal PHASE_INC produced by the modulator parameter unit 2184, generates a sine and cosine signal SIN/COS that is coupled to the multiplier 2186. The PHASE_INC signal causes the phase of the generated sine and cosine signal SIN/COS to be incremented (or decremented).

The multiplier 2186 multiplies the sine and cosine signal SIN/COS produced by the complex NCO 2185 and the output I/Q PULSE of the interpolation filter 2183 to produce, at an output, a DAC-ready wave form S31 that has been differentially encoded modulated into a software selectable modulation type, interpolated to the output sample rate, pulse shape filtered, and spectrally shifted from baseband to a selectable carrier frequency.

It should be noted that the various control signal produced by the timing and control unit 2181 are modified by, illustratively, controller 2184 in response to the type of input data (S25D) received, the rate of that input data (e.g., defined according to the average frequency of the data clock S25C), the type of output data to be transmitted (e.g., BPSK, QPSK, QAM and the like) and the frequency of the master clock. In addition to the above, the timing and control unit 2181 produces a burst gate/power control signal S34 that is used to adjust the power level in the back channel transmitter power amplifier 224, as previously described.

Figure 5:
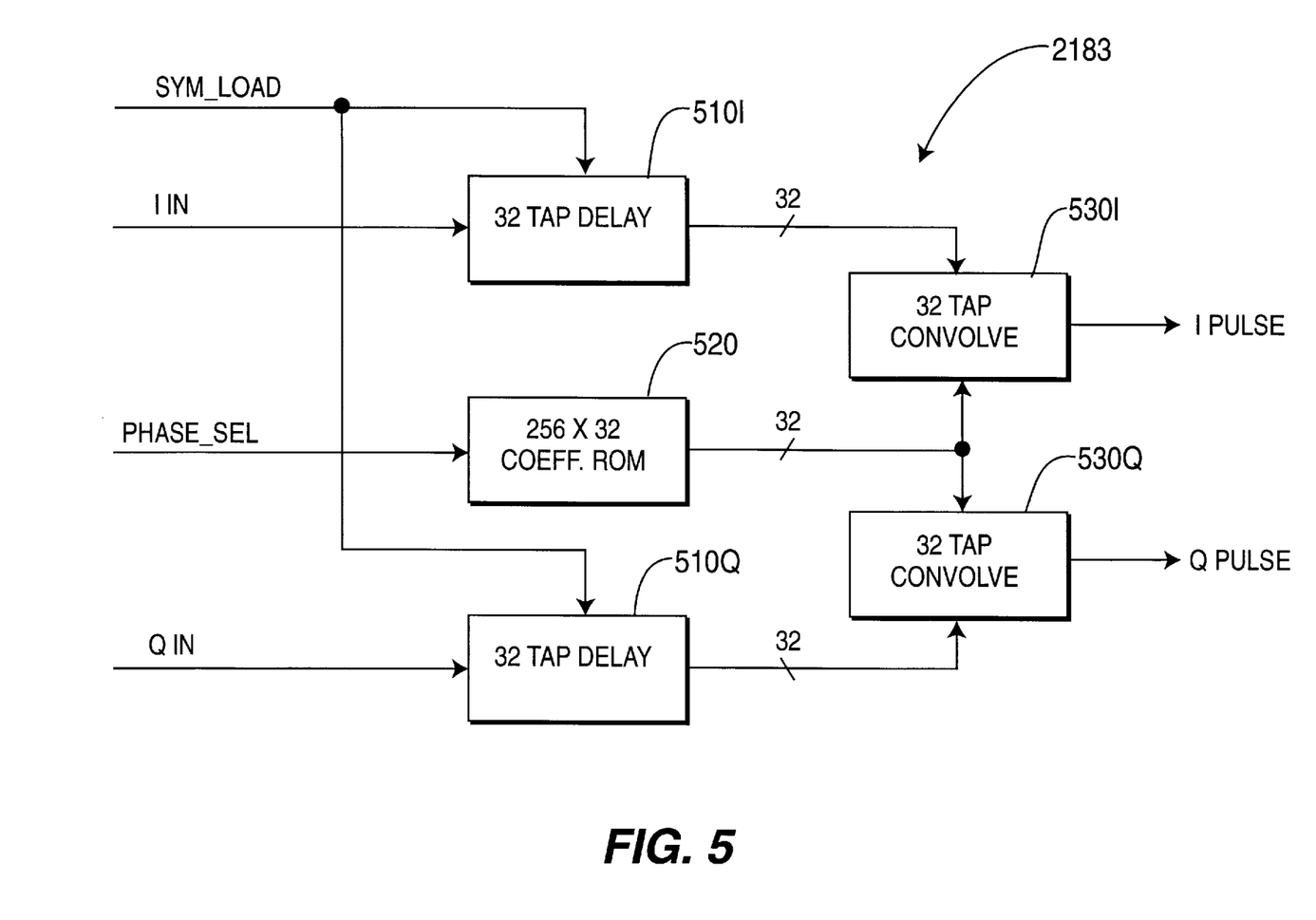
FIG. 5 depicts a block diagram of an interpolating filter and pulse shaping circuit according to the invention and suitable for use in variable rate modulator of FIG. 4.

FIG. 5 depicts an interpolating filter and pulse shaping circuit according to the invention and suitable for use in variable rate modulator of FIG. 4. Specifically, the interpolation filter 2183 of FIG. 5 comprises an in-phase 32 tap delay 510I, a quadrature-phase 32 tap delay 510Q, a 256×32 coefficient read only memory (ROM) 520, an in-phase 32 tap convolver 530I and a quadrature-phase 32 tap convolver 530Q.

The in-phase 32 tap delay 510I and quadrature-phase 32 tap delay 510Q receive respective in-phase (I-IN) and quadrature-phase (Q-IN) symbols from the encoder 2182 at a rate determined by the SYM_LOAD control signal. The in-phase 32 tap delay 510I and quadrature-phase 32 tap delay 510Q supply, respectively, in-phase and quadrature-phase delayed symbols to, respectively, the in-phase 32 tap convolver 530I and the quadrature-phase 32 tap convolver 530Q.

The operation of the 32 tap convolvers will be described in more detail below with respect to FIG. 6. Briefly, the in-phase 32 tap convolver 530I and the quadrature-phase 32 tap convolver 530Q operate to shape the pulse of the respective in-phase (I PULSE) and quadrature-phase (Q PULSE) symbols. The actual shape of the in-phase (I PULSE) and quadrature-phase (Q PULSE) symbols is determined by coefficients stored in the 256×32 coefficient ROM 520.

The 256×32 coefficient ROM 520 receives, as an address generation signal, a phase select signal PHASE_SEL produced by the timing and control unit 2181. In response, the 256×32 coefficient ROM 520 provides, at its outputs, the selected coefficients used in the in-phase and quadrature-phase convolvers 530I and 530Q. The coefficients comprise real samples. Additionally, since the bits-to-symbol mapping in the encoder is completely programmable, the variable rate modulator is compatible with virtually any form of BPSK/QPSK/QAM modulation scheme.

Figure 6:
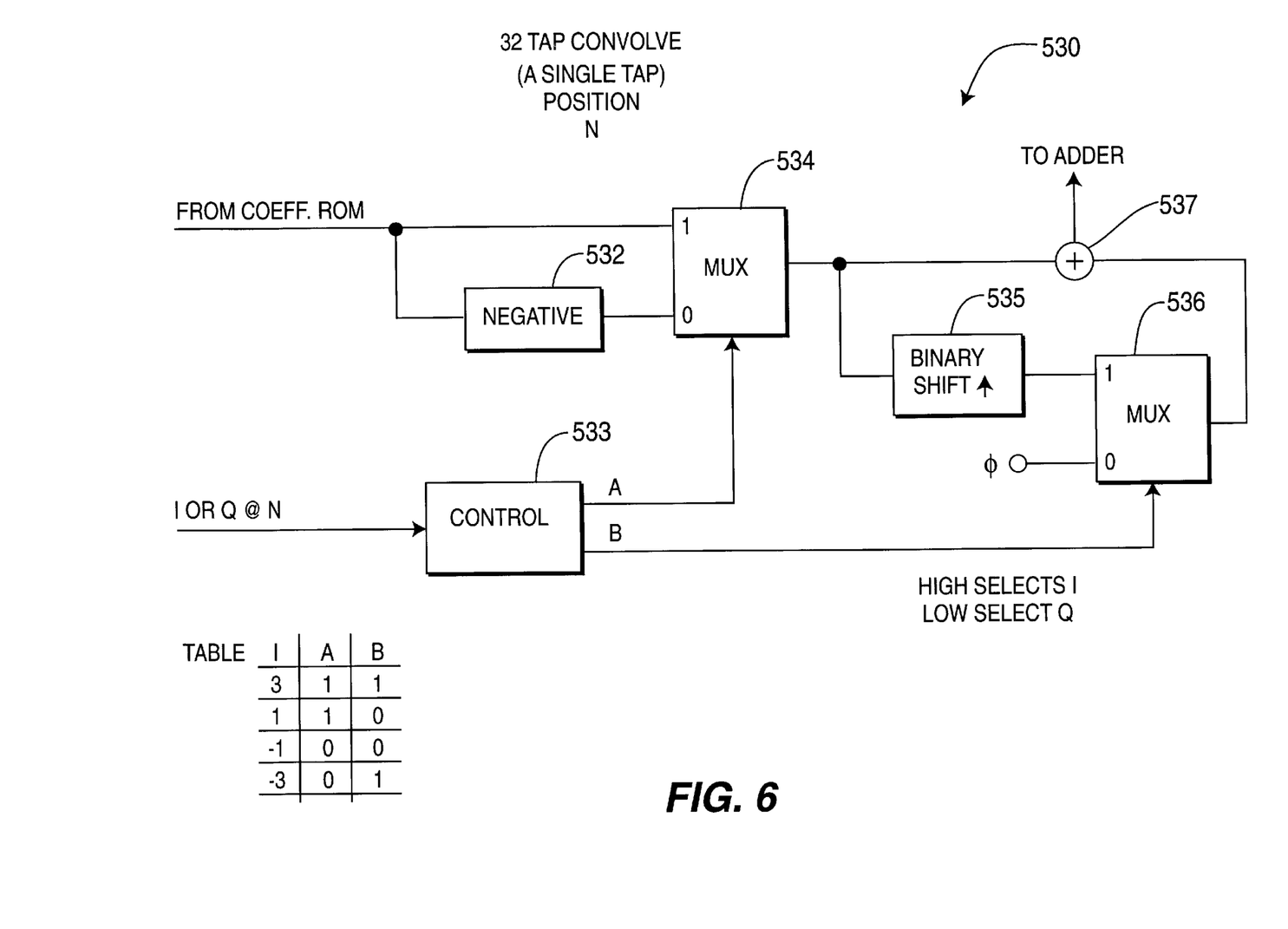
FIG. 6 depicts a block diagram of a single tap of a multiple tap convolver according to the invention and suitable for use in the interpolating filter of FIG. 5.

FIG. 6 depicts a single tap of a 32 tap convolver according to the invention and suitable for use in the interpolating filter of FIG. 5. Specifically, FIG. 6 depicts a single tap of either the in-phase 32 tap convolver 530I and the quadrature-phase 32 tap convolver 530Q of FIG. 5. The single tap depicted in FIG. 6 comprises a symbol negate unit 532, a control unit 533, a first multiplexer 534, a binary shifter 535, a second multiplexer 536 and an adder 537. It is important to note that all operations are performed using shift, negate or add functions. That is, the multiple tap convolvers of the invention do not require the use of multipliers.

A coefficient received from the 256×32 coefficient ROM 520 is coupled to the input of the negate unit 532 and a first input (1) of the first multiplexer unit 534. The negate unit negates the coefficient and presents the negated coefficient to a second input (0) of the first multiplexer 532. The first multiplexer unit 534 receives a selection control signal A from the control unit 533, and responsively couples either the received coefficient (A=1) or the negated received coefficient (A=0) to an output.

The output of the first multiplexer unit 534 is coupled to a first input of the adder 537 and the input of the binary shifter 535. The binary shifter operates to double, via a shift operation, the coefficient received from the first multiplexer unit 534. The output of the binary shifter 535 is coupled to a first input (1) of the second multiplexer unit 536. A second input of the second multiplexer unit 536 is coupled to a null (0) source. The second multiplexer unit 536 receives a selection control signal B from the control unit 533, and responsively couples either the output of the binary shifter 535 (A=1) or the null source (A=0) to an output. The output of the second multiplexer unit 536 is coupled to a second input of the adder 537. The signal at the output of the adder 537 forms part of the output signal of the 32 tap convolver 530I or 530Q.

The control unit 533 receives a symbol, illustratively a 16 QAM encoded symbol (i.e., a symbol having +1, +3, −1 and −3 level), and responsively adapts the two output control signals A and B as shown below in Table 1.

TABLE 1

| Symbol | A | B |
| --- | --- | --- |
| 3 | 1 | 1 |
| 1 | 1 | 0 |
| −1 | 0 | 0 |
| −3 | 0 | 1 |

In the case of a 16 QAM symbol equal to three, the received coefficient is shifted (i.e., doubled) and added to itself to produce, at the output of the adder 537, a value equal to three times the received coefficient. In the case of a 16 QAM symbol equal to one, the received coefficient is added to the null to produce at the output of the adder 537, a value equal to three times the received coefficient. In the case of a 16 QAM symbol equal to negative one, the received coefficient is negated and added to the null to produce at the output of the adder 537, a value equal to negative one times the received coefficient. In the case of a 16 QAM symbol equal to negative three, the received coefficient is negated and shifted (i.e., doubled) and then added to the negated received coefficient to produce, at the output of the adder 537, a value equal to negative three times the received coefficient.

It is important to understand the timing and control relationships of the various components in the above Figures. For example, both the SYM_LOAD and PHASE_SEL signals are used to control, and simultaneously perform, the pulse shaping and rate conversion (i.e., upconverting) functions to create the proper baud rate for the upstream transmitter. That is, depending upon the rate at which symbols are loaded (determined by SYM_LOAD) and the rate at which the bandwidth of the output pulses are changed (determined by PHASE_SEL). Moreover, the rate at which the in-phase pulses I PULSE and quadrature-phase pulses Q PULSE pulses are produced is defined by the PHASE_SEL signal. In addition, the rate at which the in-phase input symbols I IN and quadrature-phase input symbols Q IN are received by the interpolation filter 2183 is defined by the data input signal S25D and the derived, main clock phase-locked clock signal DATA_LOAD.

By maintaining the above timing relationships, the data rate of the output data stream S35 transmitted by the back channel transmitter 204 is made to conform to the data rate of the input data stream S20 received by the forward channel receiver 202. This occurs even if a fixed crystal timing source is used for the 100 MHz clock 214.

The invention has great utility in upstream transmission circuits for use in information distribution systems, such as cable television systems. The invention advantageously provides universal network interface 106 operation using, e.g., a fixed frequency master clock source by, e.g., causing the variable rate modulator to slave itself to the master clock. While the edges of the data clock S25C are coincident with the edges of the clock signal S31, the actual frequency of the clock stream S25C is much less than the frequency of the clock signal S31. In the exemplary embodiment, the clock signal S31 comprises, illustratively, a 100 MHz clock signal, while the clock stream S25C comprises, illustratively, a variable clock signal having an average frequency of 250 Khz clock. Thus, the edge placement of the clock stream S25C (for any frequency) is accurate to 100 MHz resolution.

The interpolation filter 2183 of the advantageously provides both a root raised cosine filtering function and an interpolation filtering function. Advantageously, this dual function interpolation filter is implemented using only shift and add functions to simultaneously implement both the variable rate and pulse shaping functions. By contrast, in a known two stage arrangement a first stage comprising a multiple tap filter and a convolver operates to perform a pulse shaping function alone (i.e., no phase selection function), and a second stage comprising a second convolver operates to perform an interpolation function alone. The second stage necessarily utilizes a multiplier.

Although various embodiments which incorporate the teachings of the present invention have been shown and described in detail herein, those skilled in the art can readily devise many other varied embodiments that still incorporate these teachings.

What is claimed is:

1. Apparatus for selectively encoding a variable rate data stream according to one of a plurality of modulation formats, comprising:
    a timing control circuit, coupled to receive a data clock associated with said variable rate data stream and a fixed frequency master clock, for phase locking said data clock to said master clock to produce a locked data clock;
    an encoder, coupled to said timing control circuit and receiving said variable rate data stream at a rate determined by said locked data clock, for encoding, in response to a format selection signal, said variable rate data stream according to one of a plurality of encoding formats; and
    a polyphase filter, coupled to said encoder and said timing control circuit, for adapting a pulse shape characteristic and a baud rate characteristic of said encoded variable rate data stream to produce a modulated baseband signal.

2. The apparatus of claim 1, further comprising:
    a complex signal source, for generating a complex signal in response to a control signal; and
    a multiplier, coupled to said complex signal source and said filter, for multiplying said modulated baseband signal and said complex signal to produce a carrier modulated signal.

3. The apparatus of claim 1, wherein said polyphase filter comprises:
    an in-phase multiple tap delay, coupled to receive an in-phase component of said encoded variable rate data stream, for responsively delaying, in accordance with a symbol load control signal, said in-phase component of said encoded variable rate data stream;
    a quadrature-phase multiple tap delay, coupled to receive a quadrature-phase component of said encoded variable rate data stream, for responsively delaying, in accordance with said symbol load control signal, said quadrature-phase component of said encoded variable rate data stream;
    an in-phase multiple tap convolver, coupled to said in-phase multiple tap delay, for convolving, in accordance with a selectable phase coefficient, said delayed in-phase component of said encoded variable rate data stream;
    a quadrature-phase multiple tap convolver, coupled to said quadrature-phase multiple tap delay, for convolving, in accordance with said selectable phase coefficient, said delayed quadrature-phase component of said encoded variable rate data stream; and
    a source of said selectable phase coefficients, coupled to said in-phase convolver and said quadrature-phase convolver, for providing said phase coefficients in response to a phase selection control signal.

4. The apparatus of claim 3, wherein each of said in-phase and quadrature-phase multiple tap convolvers comprises:
    a first multiplexer, responsive to a first control signal, for providing at an output one of an input coefficient or a negated input coefficient;
    a second multiplexer, coupled to said output of said first multiplexer via a shift register and responsive to a second control signal, for providing at an output one of a shifted output of said first multiplexer or a null;
    an adder, coupled to said first and second multiplexers, for adding said first multiplexer output signal to said second multiplexer output signal to produce at an output a pulse shaped signal;
    a controller, coupled to said first and second multiplexers, for providing said first and second control signals in response to said delayed in-phase component or said delayed quadrature-phase component of said encoded variable rate data stream, said controller operating to shape the pulse of said output signal of said adder.

5. The apparatus of claim 3, wherein said source of selectable phase coefficients comprises a read-only memory (ROM).

6. The apparatus of claim 3, wherein each of said in-phase multiple-tap delay and said quadrature-phase multiple tap delay comprise thirty two taps.

7. The apparatus of claim 4, wherein each of said in-phase and quadrature-phase multiple tap convolvers comprise thirty two tap convolvers.

8. In an information distribution system, modulation apparatus for use in a back channel transmitter, said back channel transmitter receiving a variable rate data stream and an associated data clock, said apparatus comprising:

a timing control circuit, for phase locking said data clock to a master clock;

an encoder, coupled to receive said locked clock and said data signal, for selectively quadrature encoding said data signal to produce an in-phase data signal and an associated quadrature-phase data signal; and a polyphase filter, for pulse shaping and interpolating said in-phase and associated quadrature-phase data signals to produce an output signal.

9. The apparatus of claim 5, further comprising:

a complex signal source, for generating a complex signal in response to a control signal; and a multiplier, coupled to said complex signal source and said filter, for multiplying said modulated baseband signal and said complex signal to produce a carrier modulated signal.

10. The apparatus of claim 5, wherein said polyphase filter comprises:

an in-phase multiple tap delay, coupled to receive an in-phase component of said encoded variable rate data stream, for responsively delaying, in accordance with a symbol load control signal, said in-phase component of said encoded variable rate data stream;

a quadrature-phase multiple tap delay, coupled to receive a quadrature-phase component of said encoded variable rate data stream, for responsively delaying, in accordance with said symbol load control signal, said quadrature-phase component of said encoded variable rate data stream;

an in-phase multiple tap convolver, coupled to said in-phase multiple tap delay, for convolving, in accordance with a selectable phase coefficient, said delayed in-phase component of said encoded variable rate data stream;

a quadrature-phase multiple tap convolver, coupled to said quadrature-phase multiple tap delay, for convolving, in accordance with said selectable phase coefficient, said delayed quadrature-phase component of said encoded variable rate data stream; and a source of said selectable phase coefficients, coupled to said in-phase convolver and said quadrature-phase multiple tap convolver, for providing said phase coefficients in response to a phase selection control signal.

11. The apparatus of claim 10, wherein each of said in-phase and quadrature-phase multiple tap convolvers includes a plurality of taps, each of said plurality of taps comprising:

a first multiplexer, responsive to a first control signal, for providing at an output one of an input coefficient or a negated input coefficient;

a second multiplexer, coupled to said output of said first multiplexer via a shift register and responsive to a second control signal, for providing at an output one of a shifted output of said first multiplexer or a null;

an adder, coupled to said first and second multiplexers, for adding said first multiplexer output signal to said second multiplexer output signal to produce at an output a pulse shaped signal;

a controller, coupled to said first and second multiplexers, for providing said first and second control signals in response to said delayed in-phase component or said delayed quadrature-phase component of said encoded variable rate data stream, said controller operating to shape the pulse of said output signal of said adder.

12. A network interface module (NIM), comprising:

a forward channel receiver, for demodulating forward channel information received from a communications network;

a back channel transmitter, for transmitting control information to said network, said back channel transmitter comprising a variable rate modulator for modulating said control information according to one of a plurality of modulation formats in response to a selection signal;

said forward channel receiver and said back channel transmitter being responsive to a fixed frequency master clock;

said variable rate modulator comprising:

a timing control circuit, coupled to receive a data clock associated with a variable rate data stream and said fixed frequency master clock, for phase locking said data clock to said master clock to produce a locked data clock;

an encoder, coupled to said timing control circuit and receiving said variable rate data stream at a rate determined by said locked data clock, for encoding, in response to a format selection signal, said variable rate data stream according to one of a plurality of encoding formats; and a polyphase filter, coupled to said encoder and said timing control circuit, for adapting a pulse shape characteristic and a baud rate characteristic of said encoded variable rate data stream to produce a modulated baseband signal.

13. The network interface module of claim 12, further comprising:

a complex signal source, for generating a complex signal in response to a control signal; and a multiplier, coupled to said complex signal source and said filter, for multiplying said modulated baseband signal and said complex signal to produce a carrier modulated signal.

14. The network interface module of claim 12, wherein said polyphase filter comprises:

an in-phase multiple tap delay, coupled to receive an in-phase component of said encoded variable rate data stream, for responsively delaying, in accordance with a symbol load control signal, said in-phase component of said encoded variable rate data stream;

a quadrature-phase multiple tap delay, coupled to receive a quadrature-phase component of said encoded variable rate data stream, for responsively delaying, in accordance with said symbol load control signal, said quadrature-phase component of said encoded variable rate data stream;

an in-phase multiple tap convolver, coupled to said in-phase multiple tap delay, for convolving, in accordance with a selectable phase coefficient, said delayed in-phase component of said encoded variable rate data stream;

a quadrature-phase multiple tap convolver, coupled to said quadrature-phase multiple tap delay, for convolving, in accordance with said selectable phase coefficient, said delayed quadrature-phase component of said encoded variable rate data stream; and a source of said selectable phase coefficients, coupled to said in-phase convolver and said quadrature-phase convolver, for providing said phase coefficients in response to a phase selection control signal.

15. The network interface module of claim 14, wherein each of said in-phase and quadrature-phase multiple tap convolvers comprises:

a first multiplexer, responsive to a first control signal, for providing at an output one of an input coefficient or a negated input coefficient;

a second multiplexer, coupled to said output of said first multiplexer via a shift register and responsive to a second control signal, for providing at an output one of a shifted output of said first multiplexer or a null;

an adder, coupled to said first and second multiplexers, for adding said first multiplexer output signal to said second multiplexer output signal to produce at an output a pulse shaped signal;

a controller, coupled to said first and second multiplexers, for providing said first and second control signals in response to said delayed in-phase component or said delayed quadrature-phase component of said encoded variable rate data stream, said controller operating to shape the pulse of said output signal of said adder.

16. The network interface module of claim 14, wherein said source of selectable phase coefficients comprises a read-only memory (ROM).

17. The network interface module of claim 14, wherein each of said in-phase multiple-tap delay and said quadrature-phase multiple tap delay comprise thirty two taps.

18. The network interface module of claim 15, wherein each of said in-phase and quadrature-phase multiple tap convolvers comprise thirty two tap convolvers.

* * * * *